United States Patent
Ishfaq et al.

(10) Patent No.: US 10,321,372 B2
(45) Date of Patent: Jun. 11, 2019

(54) MODIFIED CELLULAR PROTOCOL SELECTION

(71) Applicant: General Motors LLC, Detroit, MI (US)

(72) Inventors: Mohammad Ishfaq, Northville, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 311 days.

(21) Appl. No.: 14/678,078

(22) Filed: Apr. 3, 2015

(65) Prior Publication Data
US 2016/0295475 A1 Oct. 6, 2016

(51) Int. Cl.
*H04W 36/08* (2009.01)
*H04W 36/32* (2009.01)
*H04W 4/14* (2009.01)
*H04W 76/30* (2018.01)

(52) U.S. Cl.
CPC ............ *H04W 36/08* (2013.01); *H04W 4/14* (2013.01); *H04W 36/32* (2013.01); *H04W 76/30* (2018.02)

(58) Field of Classification Search
CPC . H04W 36/0022; H04W 36/32; H04W 36/08; H04W 36/16; H04W 76/06; H04W 76/026; H04W 76/02; H04W 88/10; H04W 88/02; H04W 88/06; H04W 24/02; H04W 24/04; H04W 48/18; H04W 4/14; H04W 4/046; H04W 60/04; H04W 28/0247; H04W 36/14; H04W 76/30; H04W 76/16; H04W 4/50; H04L 65/1016; H04L 51/04; H04L 47/2475
See application file for complete search history.

(56) References Cited

U.S. PATENT DOCUMENTS

| | | | | |
|---|---|---|---|---|
| 8,537,748 B2 * | 9/2013 | Witzel | ................... | H04W 92/02 370/328 |
| 8,630,255 B1 * | 1/2014 | Kunz | ................ | H04W 36/0088 370/255 |
| 2009/0258671 A1 * | 10/2009 | Kekki | ................. | H04W 76/027 455/552.1 |
| 2011/0059739 A1 * | 3/2011 | Huang | .................. | H04W 48/18 455/435.1 |
| 2011/0216645 A1 * | 9/2011 | Song | ................. | H04W 36/0022 370/216 |
| 2016/0119823 A1 * | 4/2016 | Ko | ........................ | H04W 24/08 370/252 |

\* cited by examiner

*Primary Examiner* — Ricardo H Castaneyra
(74) *Attorney, Agent, or Firm* — David Willoughby; Reising Ethington P.C.

(57) ABSTRACT

A system and method of regulating attachment between a cellular wireless device and a wireless carrier system includes: attaching a vehicle telematics unit to a cellular base station using a long-term evolution (LTE) cellular protocol; detecting that the vehicle telematics unit is able to carry out voice communications but unable to send short message service (SMS) messages using the attached cellular base station; ending cellular communications between the vehicle telematics unit and the selected base station in response; and beginning cellular communications with a different cellular base station that permits circuit-switched SMS messaging.

6 Claims, 2 Drawing Sheets

MODIFIED CELLULAR PROTOCOL SELECTION

TECHNICAL FIELD

The present invention relates to wireless devices and cellular protocols used by those devices. More particularly, it relates to a wireless device's selection of cellular protocols based on circuit-switched and packet-switched feature availability.

BACKGROUND

As cellular communications systems have evolved, a number of cellular protocols or technologies have been created to define the evolution. For example, cellular systems are currently transitioning between earlier cellular protocols that can be described in terms of 3G (e.g., CDMA 2000 and UMTS) to 4G long-term evolution (LTE) cellular protocols. As the transitions occur, wireless devices communicating over cellular communications systems often interact with base stations that offer 3G cellular protocols or LTE protocols. The wireless devices may be able to communicate using both 3G and LTE cellular protocols but are programmed to prefer the newer LTE cellular protocols because they generally offer better performance relative to their older 3G counterparts. This preference is governed by a number of agreed-upon industry standards that have been established by the 3GPP organization.

Some wireless devices have unique configurations and a preference to use one cellular protocol over another that may interfere with their unique configurations. In one example, LTE cellular protocols use packet-switching for both voice communications as well as short message system (SMS) messaging and cellular chipsets can include default instructions to prefer LTE cellular protocols. But some wireless devices may be configured to use LTE cellular protocols for voice communications and a circuit-switched cellular protocol for short message system (SMS) messaging. When wireless devices configured in this way attach to a base station providing cellular communications service using LTE, the devices can detect that voice communications are possible and then remain attached to the base station despite an inability to send SMS messages using the packet-switched cellular protocol. Given the preference for LTE use, the specially-configured wireless device may remain in a condition where it cannot communicate SMS messages.

SUMMARY

According to an embodiment of the invention, there is provided a method of regulating attachment between a cellular wireless device and a wireless carrier system. The method includes attaching a vehicle telematics unit to a cellular base station using a long-term evolution (LTE) cellular protocol; detecting that the vehicle telematics unit is able to carry out voice communications but unable to send short message service (SMS) messages using the attached cellular base station; ending cellular communications between the vehicle telematics unit and the selected base station in response; and beginning cellular communications with a different cellular base station that permits circuit-switched SMS messaging.

According to another embodiment of the invention, there is provided a method of regulating attachment between a cellular wireless device and a wireless carrier system. The method includes detecting, at a vehicle telematics unit, the presence of a plurality of cellular base stations providing cellular communications service via different cellular protocols; selecting, at the vehicle telematics unit, one of the plurality of cellular base stations that provides cellular communications service using a long term evolution (LTE) cellular protocol; wirelessly attaching the vehicle telematics unit to the selected cellular base station; determining that the vehicle telematics unit attached to the selected cellular base station is unable to carry out short message service (SMS) messaging and is able to carry out voice communications; ending cellular communications via the selected base station that provides cellular communications via the LTE cellular protocol in response; and beginning cellular communications via a second cellular base station providing cellular communications using a different cellular protocol.

According to yet another embodiment of the invention, there is provided a vehicle telematics unit that includes a microprocessor, a computer-readable memory device, and an antenna, wherein the microprocessor directs the vehicle telematics unit to: attach to a cellular base station via the antenna using a long term evolution (LTE) cellular protocol based on a hierarchy of cellular protocols stored in the computer-readable memory device; detect that voice communications are possible over the attached cellular base station but sending short message service (SMS) messages is not possible; end cellular communications using the attached base station in response to the detection that voice but not SMS communication is possible; and begin cellular communications with a different cellular base station that permits circuit-switched SMS messaging.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below involves a vehicle telematics unit that uses cellular communications systems. The vehicle telematics unit can use cellular chipsets that are programmed to prefer LTE cellular protocols over older cellular protocols (e.g., 2G or 3G). While some vehicle telematics units can carry out packetized voice communications over LTE cellular protocols, these vehicle telematics units may also rely on older cellular protocols or circuit-switched mechanisms to communicate SMS messages. As vehicle telematics units scan their surroundings to look for acceptable cellular base stations through which communications are possible, they may inherently prefer base stations operating based on an LTE cellular protocol over an older or less preferred cellular communications protocol. This behavior is acceptable when a vehicle telematics unit supports both voice communications and SMS messaging using the LTE cellular protocol (i.e., both voice and SMS features are packet-switched). However, when the vehicle telematics unit only supports voice communications over LTE, the unit may remained attached to a base station using LTE despite not being able to provide SMS messaging. Cellular chipsets that conform to 3GPP standards, such as 3GPP technical standard 23.221, and are used by the vehicle telematics units may be configured to stay attached to the LTE-using base station despite an inability of the vehicle telematics unit to send SMS.

To fix this condition, the vehicle telematics unit can be programmed to determine whether the base station it attaches to supports circuit-switched SMS messaging when packet-switched voice service is used. If not, the vehicle telematics unit can be directed to detach from the base station based on the determination and begin searching for another cellular base station that is capable of supporting SMS using circuit-switched mechanisms.

Communications System—

Figure 1:
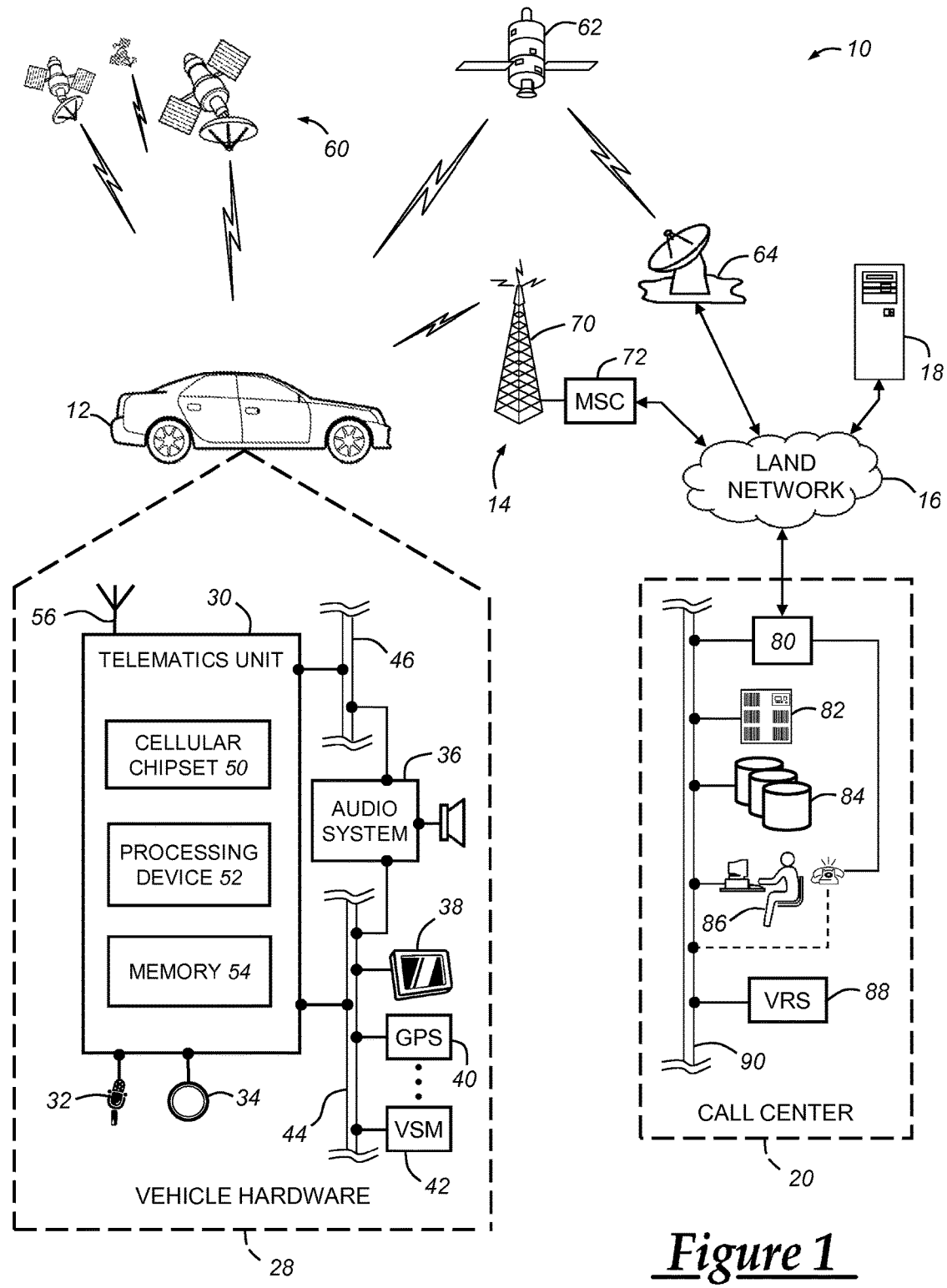
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cellular base stations 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
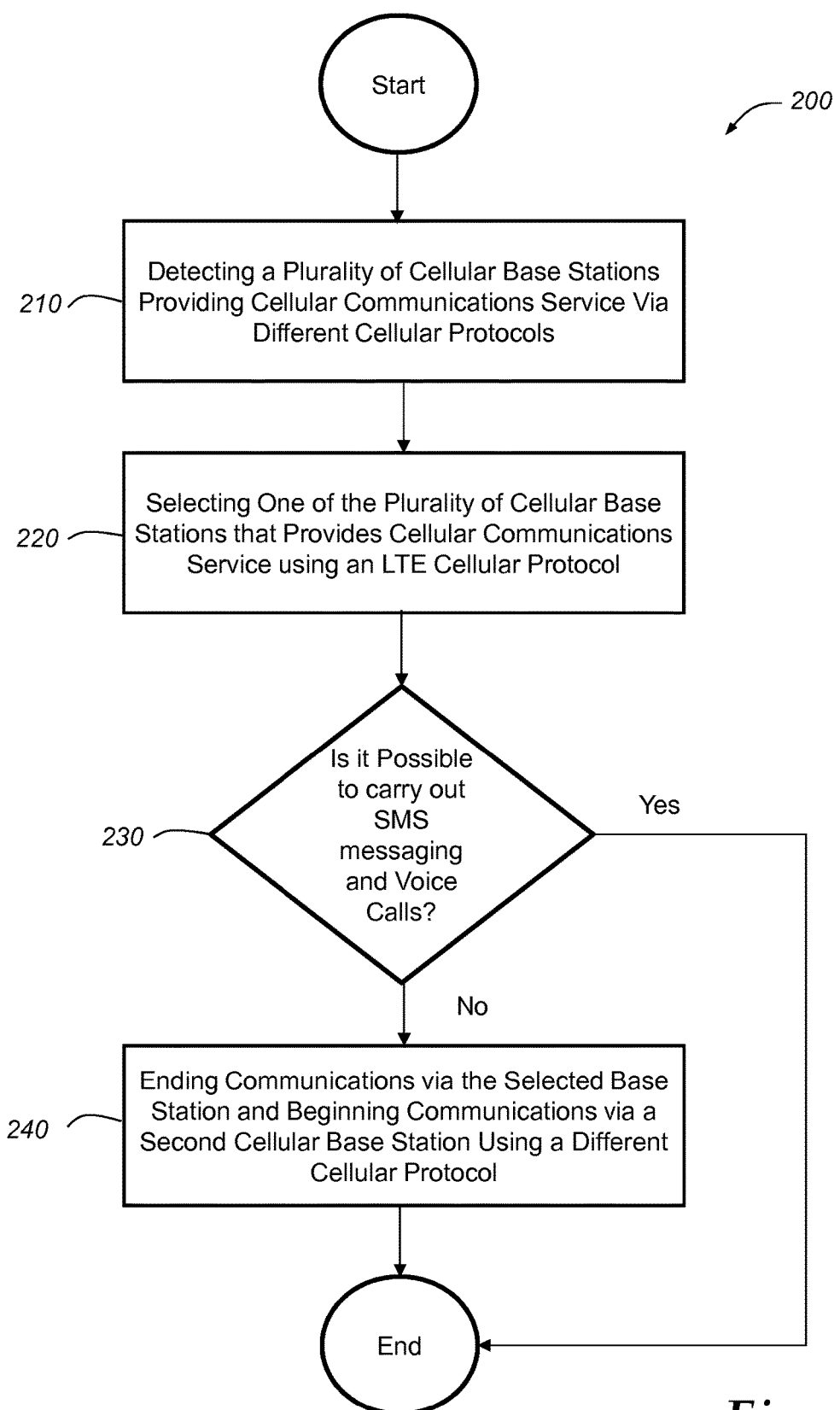
FIG. 2 is a flow chart depicting an embodiment of a method of regulating attachment between a cellular wireless device to a wireless carrier system.

Turning now to FIG. 2, there is shown a method 200 of regulating wireless attachment of the vehicle telematics unit 30 to the wireless carrier system 14. The method 200 begins at step 210 by detecting, at the vehicle telematics unit 30, the presence of a plurality of cellular base stations 70 providing cellular communications service via different cellular protocols. As the vehicle 12 moves, the vehicle telematics unit 30 periodically attempts to identify a cellular base station 70 it can connect with along with a variety of variables associated with each base station 70. For example, the vehicle telematics unit 30 can receive wireless signals broadcast by the cellular base stations 70 that indicate one or more variables, such as the cellular protocol used by the base station 70, the signal strength the vehicle telematics unit 30 receives, or the location of the cellular base station 70. The vehicle telematics unit 30 can use the variables received from the cellular base stations to determine which to attach to or "camp on." Generally, wireless devices, such as the vehicle telematics unit 30, select a cellular base station that includes the most attractive variables. That is, cellular base stations with stronger signals are preferred relative to those with weaker signals and base stations operating using a more-preferred cellular protocol can be chosen over one with a less-preferred cellular protocol.

Vehicle telematics units 30 prefer one cellular protocol over another based on a hierarchy of cellular protocols. Cellular protocols involve an agreed upon set of standards or rules used to configure wireless telephony hardware in a way that they can communicate with each other using a particular cellular protocol. A number of different cellular protocols exist and are commonly referred to using names such as 4G LTE or just LTE, 3G (CDMA 2000, EVDO, GPRS, EDGE, or UMTS), and 2G (GSM and CDMA), etc. And each of the cellular protocols have different functionality and capabilities. In general, cellular protocols are ranked by preference in the following order: 4G LTE, 3G, and then 2G. The vehicle telematics unit 30 can achieve faster data transfer rates and higher quality voice communications using 4G LTE relative to 3G. A similar relationship exists between 3G and 2G respectively. As the vehicle telematics unit 30 moves, it can encounter a plurality of cellular base stations 70 that provide cellular service using a common cellular protocol (e.g., 3G) or different cellular protocols (e.g., 4G LTE and 3G). The method 200 proceeds to step 220.

At step 220, one of the plurality of cellular base stations that provides cellular communications service using an LTE or 4G LTE cellular protocol is selected at the vehicle telematics unit 30. After identifying the cellular base station (s) 70 that are available to communicate, the vehicle telematics unit 30 can select the most desirable one and attach to it. When the vehicle telematics unit 30 detects a cellular base station providing service using a 3G cellular protocol and another cellular base station providing service using a 4G LTE protocol, the vehicle telematics unit 30 can choose the base station providing service via 4G LTE and wirelessly attach. After attaching to the LTE-providing cellular base station, the vehicle telematics unit 30 can confirm that the unit 30 can carry out voice communications using the attached base station. If so, the method 200 proceeds to step 230.

At step 230, the vehicle telematics unit 30 attached to the selected cellular base station 70 determines whether it is possible to carry out short message service (SMS) messaging along with voice communications via the cellular base station providing cellular service via LTE. After the vehicle telematics unit 30 determines that voice communications can be transmitted via packet using LTE via the cellular base station, the unit 30 determines whether SMS messaging is possible. Cellular base stations supporting LTE can offer SMS messaging via the IP multimedia subsystem (IMS). However, the vehicle telematics unit 30 may be configured in a way that it is unable to send SMS messages using LTE/IMS despite having the ability to carry out voice calls using LTE. Instead, the vehicle telematics unit 30 may rely on circuit-switched cellular protocols, such as 3G, for SMS messaging. When the vehicle telematics unit 30 is configured that way, it may be unable to carry out SMS messaging using LTE yet nonetheless be attached to an LTE-providing cellular base station. The processor 52 of the vehicle telematics unit 30 can detect this anomaly and can direct the vehicle telematics unit 30 to detach from the cellular base station providing cellular service via LTE. The method 200 proceeds to step 240.

At step 240, cellular communications are ended via the selected base station that provides cellular communications via the LTE cellular protocol and begun via a second cellular base station 70 providing cellular communications using a different cellular protocol. The vehicle telematics unit 30 searches for a new or different cellular base station after detaching from the base station providing service via LTE. A different cellular base station could provide cellular service solely via a circuit-switched cellular protocol, such as 2G or 3G. When the vehicle telematics unit 30 identifies another cellular base station that provides cellular service via 3G rather than, the unit 30 can attach to it. The vehicle telematics unit 30 can then offer voice communications as well as SMS messaging using circuit-switched cellular protocols. Or the second, different cellular base station could provide service via two different cellular protocols-4G LTE and 3G, for instance. In that example, the vehicle telematics unit 30 could communicate voice conversations using the packet-switched network via LTE and SMS messaging using the circuit-switched network via 3G. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating wireless attachment of a vehicle telematics unit to wireless carrier system, the method comprising:
   (a) attaching the vehicle telematics unit to a long-term evolution (LTE) providing cellular base station;
   (b) in response to attaching to the LTE-providing cellular base station in step (a), automatically detecting that the vehicle telematics unit is configured to support voice communications using LTE but is not configured to send short message service (SMS) messages using LTE, and determining, at the vehicle telematics unit, whether the attached LTE-providing cellular base station supports circuit-switched short message service (SMS) messages when using packet-switched voice service;
   (c) in response to determining in step (b) that the attached LTE-providing cellular base station does not support circuit-switched SMS messages and without receiving a circuit-switched service indication, detaching the vehicle telematics unit from the attached LTE-providing cellular base station to end cellular communications between the vehicle telematics unit and the attached LTE-providing cellular base station;
   (d) in response to step (c) searching for and identifying a different cellular base station that permits circuit-switched SMS messaging; and
   (e) attaching to the different cellular base station identified in step (d), wherein the different identified cellular base station is configured to provide both voice communications and SMS messaging using circuit-switched cellular protocols, or is configured to provide voice communications using a packet-switched protocol and SMS messaging using a circuit-switched protocol.

2. The method of claim 1, further comprising a step of periodically identifying one or more cellular base stations capable of communicating with the vehicle telematics unit.

3. The method of claim 1, wherein the different cellular base station supports both the LTE cellular protocol and the circuit-switched SMS messaging.

4. A method of regulating wireless attachment of a vehicle telematics unit to between a cellular wireless device and a wireless carrier system, the method comprising:
   (a) detecting, at the vehicle telematics unit, a presence of a plurality of cellular base stations providing cellular communications service via different cellular protocols;
   (b) selecting, at the vehicle telematics unit, one of the plurality of cellular base stations that provides cellular communications service using a long term evolution (LTE) cellular protocol;
   (c) wirelessly attaching the vehicle telematics unit to the selected LTE-providing cellular base station;
   (d) in response to attaching to the LTE-providing cellular base station in step (c), automatically detecting that the vehicle telematics unit is configured to support voice communications using LTE but is not configured to send short message service (SMS) messages using LTE, and determining whether the attached LTE-providing cellular base station supports circuit-switched short message service (SMS) messaging when carrying out packet-switched voice communications;
   (e) in response to determining in step (d) that the attached LTE-providing cellular base station does not support circuit-switched SMS messages and without receiving a circuit-switched service indication, detaching the vehicle telematics unit from the attached LTE-providing cellular base station to end cellular communications via the attached LTE-providing base station that provides cellular communications via the LTE cellular protocol;
   (f) in response to step (e) searching for and identifying a second cellular base station providing cellular communications using a different cellular protocol; and
   (g) attaching to the second cellular base station identified in step (f), wherein the identified second cellular base station is configured to provide both voice communications and SMS messaging using circuit-switched cellular protocols, or is configured to provide voice communications using a packet-switched protocol and SMS messaging using a circuit-switched protocol.

5. The method of claim 4, wherein the second cellular base station supports both the LTE cellular protocol and the circuit-switched SMS messaging.

6. A vehicle telematics unit comprising:
a microprocessor, a computer-readable memory device, and an antenna, wherein the microprocessor directs the vehicle telematics unit to: attach to a cellular base station via the antenna using a long term evolution (LTE) cellular protocol based on a hierarchy of cellular protocols stored in the computer-readable memory device; in response to attaching to the LTE-providing cellular base station, automatically detect that the vehicle telematics unit is configured to support voice communications using LTE but is not configured to send short message service (SMS) messages using LTE, and determine that voice communications are possible over the attached LTE-providing cellular base station but sending short message service (SMS) messages is not possible; in response to determining that the attached LTE-providing cellular base station does not support circuit-switched SMS messages and without receiving a circuit-switched service indication, end cellular communications by detaching the vehicle telematics unit from the attached LTE-providing cellular base station in response to determining that voice but not SMS communication is possible; and establishing cellular communications with a different cellular base station that permits circuit-switched SMS messaging, wherein the different cellular base station is configured to provide both voice communications and SMS messaging using circuit-switched cellular protocols, or is configured to provide voice communications using a packet-switched protocol and SMS messaging using a circuit-switched protocol.

* * * * *